United States Patent
Kim et al.

(10) Patent No.: US 9,148,598 B2
(45) Date of Patent: Sep. 29, 2015

(54) IMAGE SENSOR, METHOD FOR OPERATING THEREOF, AND IMAGE PICK-UP DEVICE HAVING THE SAME

(71) Applicant: Samsung Electronics Co., Ltd., Suwon-si, Gyeonggi-Do (KR)

(72) Inventors: Byung-Jo Kim, Seoul (KR); Tae-Chan Kim, Yongin-si (KR); Kyoung Min Koh, Yongin-si (KR); Kyung-Min Kim, Suwon-si (KR)

(73) Assignee: SAMSUNG ELECTRONICS CO., LTD., Suwon-Si, Gyeonggi-Do (KR)

(*) Notice: Subject to any disclaimer, the term of this patent is extended or adjusted under 35 U.S.C. 154(b) by 0 days.

(21) Appl. No.: 14/224,668

(22) Filed: Mar. 25, 2014

(65) Prior Publication Data
US 2014/0204258 A1 Jul. 24, 2014

Related U.S. Application Data

(63) Continuation of application No. 12/852,061, filed on Aug. 6, 2010, now Pat. No. 8,698,929.

(30) Foreign Application Priority Data

Sep. 9, 2009 (KR) ......................... 10-2009-0084735

(51) Int. Cl.
*H04N 5/335* (2011.01)
*H04N 5/374* (2011.01)
(Continued)

(52) U.S. Cl.
CPC ............ *H04N 5/374* (2013.01); *H04N 5/3452* (2013.01); *H04N 5/3745* (2013.01)

(58) Field of Classification Search
CPC .... H04N 5/3452; H04N 5/374; H04N 5/3745
USPC ................. 348/294, 296, 300, 301, 302, 308, 348/333.01, 333.11
See application file for complete search history.

(56) References Cited

U.S. PATENT DOCUMENTS

| 4,858,020 A | 8/1989 | Homma |
| 4,874,164 A | 10/1989 | Miner et al. |

(Continued)

FOREIGN PATENT DOCUMENTS

| JP | H11-266399 A | 9/1999 |
| JP | 2000-004406 A | 1/2000 |

(Continued)

OTHER PUBLICATIONS

Japanese Office Action dated May 2, 2014 in corresponding application No. 2010-202295.

(Continued)

*Primary Examiner* — Lin Ye
*Assistant Examiner* — Chris Yoder, III
(74) *Attorney, Agent, or Firm* — F. Chau & Associates, LLC

(57) ABSTRACT

The image sensor includes a plurality of column lines, a plurality of active road circuits and a selection circuit. The plurality of column lines are each connected to a corresponding one of a plurality of pixels. The plurality of active road circuits are each connected to a corresponding one of the plurality of column lines. The selection circuit is configured to enable a portion of the plurality of active road circuits based on a plurality of column selection signals.

11 Claims, 13 Drawing Sheets

(51) Int. Cl.
*H04N 5/345* (2011.01)
*H04N 5/3745* (2011.01)

(56) References Cited

U.S. PATENT DOCUMENTS

| | | | |
|---|---|---|---|
| 5,920,345 A | 7/1999 | Sauer | |
| 6,480,227 B1* | 11/2002 | Yoneyama | 348/308 |
| 6,512,545 B1* | 1/2003 | Mizoguchi et al. | 348/304 |
| 6,512,858 B2 | 1/2003 | Lyon et al. | |
| 6,972,791 B1* | 12/2005 | Yomeyama | 348/230.1 |
| 7,593,047 B2 | 9/2009 | Funakoshi et al. | |
| 2004/0169748 A1 | 9/2004 | Acharya | |
| 2007/0146514 A1* | 6/2007 | Maeda et al. | 348/294 |
| 2007/0229686 A1* | 10/2007 | Hiyama et al. | 348/294 |
| 2008/0043128 A1 | 2/2008 | Poonnen et al. | |
| 2009/0040350 A1* | 2/2009 | Yamauchi | 348/302 |

FOREIGN PATENT DOCUMENTS

| | | |
|---|---|---|
| JP | 2007-142738 A | 6/2007 |
| JP | 2007-173950 A | 7/2007 |
| JP | 2009021889 A | 1/2009 |
| KR | 2001-0065625 A | 7/2001 |
| KR | 2006-0020230 A | 3/2006 |
| KR | 2008-0014408 A | 2/2008 |

OTHER PUBLICATIONS

Japanese Office Action dated Jan. 6, 2014 in corresponding Application No. 2010-202295.
Chinese Office Action dated Feb. 11, 2014 in corresponding Application No. 201010281089.5.

* cited by examiner

IMAGE SENSOR, METHOD FOR OPERATING THEREOF, AND IMAGE PICK-UP DEVICE HAVING THE SAME

CROSS-REFERENCE TO RELATED APPLICATION(S)

This application is a continuation application of and claims priority under 35 U.S.C. §120/121 to U.S. application Ser. No. 12/852,061 filed Aug. 6, 2010, which claims priority from Korean Patent Application No. 10-2009-0084735, filed on Sep. 9, 2009, in the Korean Intellectual Property Office (KIPO), the entire contents of which are incorporated herein by reference.

BACKGROUND

1. Field

Embodiments of the present invention relate to an image sensor, for example, to an image sensor selecting one or more column lines to be read among a plurality of column lines in advance and processing signals output from the some selected column lines, a method for operating the image sensor and an image pick-up device having the image sensor.

2. Description of Related Art

Currently, a CMOS image sensor is applied and used in many fields. For example, the CMOS image sensor is generally used in portable mobile devices.

Most portable mobile devices use various application chips to embody several functions. However, power sources are limited in portable device. Therefore, if power is being consumed by several application chips in the portable mobile device, power usage may become an important factor for extended use of the portable mobile device. Accordingly, to use a portable mobile device for a relatively longer time using a single charge, power consumed by the several application chips may need to be reduced.

SUMMARY

The present general invention provides an image sensor, which may reduce unnecessary power consumption by selecting a portion or only some column lines to be read from among a plurality of column lines in advance and processing signals output from the some selected column lines, an image pick up device including the image sensor, and a column line control method of the image sensor. In addition, the present general invention provides a timing controller, which may be used in the image sensor.

According to an example embodiment of the present invention, a method for operating an image sensor includes enabling a portion of column lines to read from among all column lines embodied in a pixel array by using column addresses during a vertical blank interval and processing pixel signals output from the enabled column lines by using the column addresses during an active interval following the vertical blank interval. The vertical blank interval indicates a time difference between a last line of a current image frame and a start line of a next image frame.

In an example embodiment, the enabling and the processing are performed during a preview operation, where the preview operation is used to capture a first image of an object having a lower resolution than a final image of the object to be captured.

In an example embodiment, the method further includes enabling a portion of CDS circuits from among a plurality of CDS circuits by using the column addresses.

According to an example embodiment of the present invention, an image sensor includes a plurality of column lines, a plurality of active road circuits and a selection circuit. The plurality of column lines are each connected to a corresponding one of a plurality of pixels. The plurality of active road circuits are each connected to a corresponding one of the plurality of column lines. The selection circuit is configured to enable a portion of the plurality of active road circuits based on a plurality of column selection signals.

In an example embodiment, each of the plurality of active road circuits includes a switch connected between a corresponding one of the plurality of column lines and a ground, a level shifter configured to shift a level of a selection signal generated based on a corresponding one of the plurality of column selection signals, and a switch control circuit configured to control an operation of the switch based on a control signal and an output signal of the level shifter. The selection signal is generated by the selection circuit.

In an example embodiment, the image sensor further includes a timing controller configured to generate and output column addresses during a vertical blank interval and a column decoder configured to decode the column addresses and configured to generate the plurality of column signals.

In an example embodiment, the image sensor further includes a readout circuit configured to read pixel signals output from column lines connected to the enabled active road circuits among the plurality of column lines.

In an example embodiment, the readout circuit is connected to the plurality of column lines and includes a plurality of correlated double sampling circuits that are at least one enabled and disabled based on a corresponding one of the plurality of column selection signals.

In an example embodiment, the selection circuit includes a plurality of latch circuits each configured to latch a related signal based on a corresponding one of the plurality of column selection signals.

In an example embodiment, each of the plurality of latch circuits include a selection signal generator configured to receive a corresponding one of the plurality of column selection signals and an inversion signal and configured to output a corresponding one of the related signals, an inverter configured to output the inversion signal in response to an output signal of the selection signal generator, and a first switch connected between an output terminal of the selection signal generator and a ground and switched in response to a reset signal.

In an example embodiment, each of the plurality of latch circuits further include a second switch connected between an output terminal of the inverter and the ground and switched in response to a set signal.

In an example embodiment, at least one of the plurality of pixels is a depth pixel configured generate a photo-charge corresponding to wavelengths of an infrared light spectrum.

According to an example embodiment of the present invention, an image sensor includes a plurality of column lines each connected to a corresponding one of a plurality of pixels; and a timing controller, after outputting first column addresses to enable a portion of the plurality of column lines, configured to output second column addresses that are same as the first column addresses to transmit pixel signals output from the enabled column lines to a readout circuit.

In an example embodiment, the image sensor includes a column decoder configured to decode the first column addresses and configured to generate a plurality of column selection signals, a plurality of active road circuits each connected to a corresponding one of the plurality of column lines, and a selection circuit configured to enable a portion of the plurality of active road circuits based on the plurality of column selection signals to enable the portion of column lines.

In an example embodiment, each of the plurality of active road circuits includes a switch connected between a corresponding one of the plurality of column lines and a ground, a level shifter configured to shift a level of an enable signal generated based on a corresponding one of the plurality of column selection signals, and a switch control circuit configured to control an operation of the switch based on an active road control signal and an output signal of the level shifter.

In an example embodiment, the image sensor includes a plurality of correlated double sampling circuits correspondingly connected to the plurality of column lines, each of the plurality of correlated double sampling circuits at least one of enabled and disabled in response to a signal related to a corresponding one of the plurality of column selection signals.

According to an example embodiment of the present invention, a method for operating an image sensor includes enabling a portion of a plurality of column lines in response to first column addresses output from a timing controller, and processing pixel signals output from the enabled column lines in response to second column addresses, where the second column addresses are output from the timing controller and are the same as the first column addresses.

According to an example embodiment of the present invention, an image sensor including a timing controller used in an image sensor, includes a column address generator and a state controller configured to control an operation of the column address generator. During a preview operation, the column address generator outputs first column addresses for selecting a portion of a plurality of column lines during a vertical blank interval and outputs second column addresses that are the same as the first column addresses during an active interval following the vertical blank interval.

According to an example embodiment of the present invention, an image sensor includes a plurality of column lines each connected to a corresponding one of a plurality of pixels and a timing controller configured to output first column addresses to selectively enable less than all of the plurality of column lines during a first time period and configured to output second column addresses that are same as the first column addresses during a second time period following the first time period, to transmit pixel signals output from only the enabled column lines to a readout circuit.

In an example embodiment, the timing controller selectively enables at least one of odd numbered column lines, even numbered column lines and column lines of a multiple of K, from among the plurality of column lines, where K is a natural number greater than 2.

In an example embodiment, the plurality of column lines each receive pixel data from a corresponding one of the plurality of pixels during a preview operation, where the preview operation is used to capture a first image of an object having a lower resolution than a final image of the object to be captured, and the timing controller is configured to selectively enable less than all of the plurality of column lines during the preview operation.

BRIEF DESCRIPTION OF THE DRAWINGS

These and/or other aspects and advantages of the present general invention will become apparent and more readily appreciated from the following description of the embodiments, taken in conjunction with the accompanying drawings of which.

DETAILED DESCRIPTION

Figure 1:
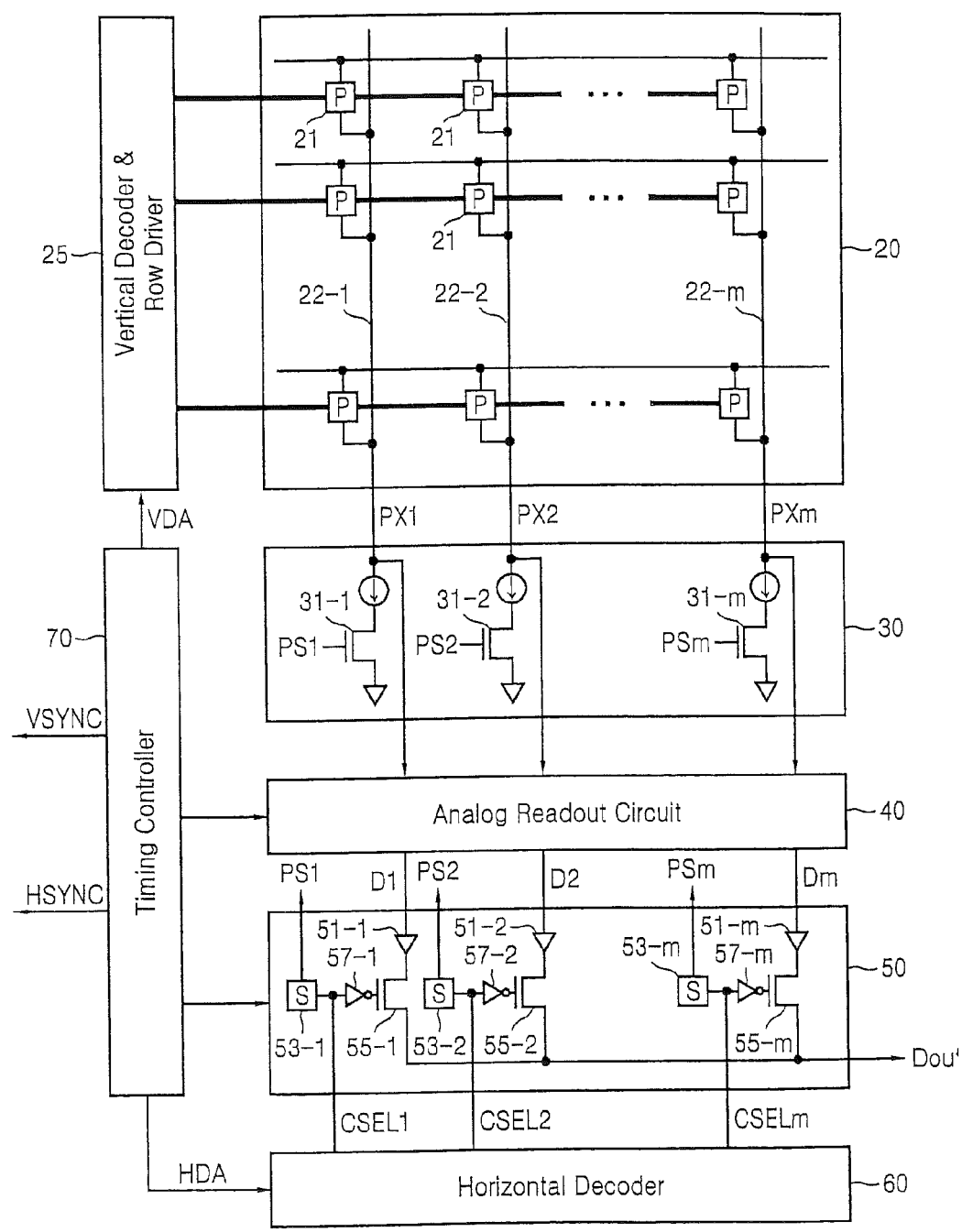
FIG. 1 shows a block diagram of an image sensor according to an example embodiment of the present invention.

Example embodiments will now be described more fully with reference to the accompanying drawings. Example embodiments of the invention may, however, be embodied in different forms and should not be construed as limited to the embodiments set forth herein. Rather, these embodiments are provided so that this disclosure is thorough and complete and fully conveys the scope of the invention to one skilled in the art. In the drawings, the thickness of layers and regions may be exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

Spatially relative terms, such as "at least one of," "below," "selected," "a part of," "remaining," "around," "over," "lower portion," and the like, may be used herein for ease of description to describe one element or feature's relationship to another element(s) or feature(s) as illustrated in the figures. The terminology used herein is for the purpose of describing example embodiments only and is not intended to be limiting of the invention. The accompanying figures are not to be considered as drawn to scale unless explicitly noted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/ or groups thereof. In this specification, the term "and/or" picks out each individual item as well as all combinations of them.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

When it is determined that a detailed description related to a related known function or configuration may make the purpose of embodiments of the invention unnecessarily ambiguous, the detailed description thereof will be omitted. Also, terms used herein are defined to appropriately describe embodiments of the invention and thus may be changed depending on a user, the intent of an operator, or a custom. Accordingly, the terms must be defined based on the following overall description within this specification.

Reference will now be made in detail to the embodiments of the present general invention, examples of which are illustrated in the accompanying drawings, wherein like reference numerals refer to the like elements throughout. The embodiments are described below in order to explain the present general invention by referring to the figures.

In a portable mobile device, such as a portable mobile device having a CMOS image sensor, the CMOS image sensor may be used in capturing (or picking-up) a still image, e.g., a photo, or a moving image, e.g., a video. When capturing a still image, e.g., a photo, a user sees an object to capture through an image display device, e.g., a flat panel display, of the portable mobile device, and once the user presses a capture button embodied to the portable mobile device, the CMOS image sensor captures a still image of the object.

The capture (or pick-up) of a still image may progress according to the following steps. First, a preview image may be captured through a CMOS image sensor. Second, a portable mobile device with the built-in CMOS image sensor displays the captured preview image to a user through an image display device. Third, the user issues a capture command using a capture button embodied to a portable mobile device. Here, the capture command may include size information. Fourth, the capture command is transmitted to a CMOS image sensor according to an internal processing of the portable mobile device and the CMOS image sensor captures a still image of the object. Fifth, the captured image is stored in an internal memory of the portable mobile device.

In the case of a preview image, showing the image with a decreased volume of data or lower quality or resolution by frame is more advantageous than showing a user a preview image of a same picture quality or resolution as one of the image captured in the portable mobile device, so that most portable mobile devices show a user a preview image having a lower volume of data or quality than a captured image at high speed through an image display device.

However, in terms of a property of a current CMOS image sensor, in a sub-sampling function used when outputting the preview image, the portable mobile device including the CMOS image sensor processes pixel signals output from all pixels, even though it may be unnecessary to read some of the pixels in a row. Accordingly, there may be unnecessary power consumption in the portable mobile device.

The present invention relates to processing pixel signals output from one or more (e.g. some, a portion, less than all) column lines, which may be necessary to read, from among all the column lines embodied in a pixel array during a preview operation processing a preview image.

FIG. 1 shows a block diagram of an image sensor according to embodiments of the present invention. Referring to FIG. 1, an image sensor 10 may include a pixel array 20, a vertical decoder/row driver 25, an active road block 30, an analog readout circuit 40, a data output block 50, a horizontal decoder 60 and a timing controller 70.

The pixel array 20 includes a plurality of pixels 21. The plurality of pixels 21 may include a plurality of color pixels, e.g., at least a red pixel, at least a green pixel and at least a blue pixel.

When the image sensor 10 is embodied as a 3-dimensional image sensor, the plurality of pixels 21 may further include at least a depth (or Z) pixel besides the color pixels. The at least one depth pixel may generate photo-charges corresponding to wavelengths of an infrared light region (or spectrum). In addition, the pixel array 20 may include a plurality of column lines 22-1 to 22-$m$, where m is a natural number. A plurality of pixels 21, which are arranged in a column direction, may be connected to each of the plurality of column lines 22-1 to 22-$m$.

FIGS. 2A to 2D show circuit diagrams of the pixel illustrated in FIG. 1, according to example embodiments of the present invention.

Figure 2A:
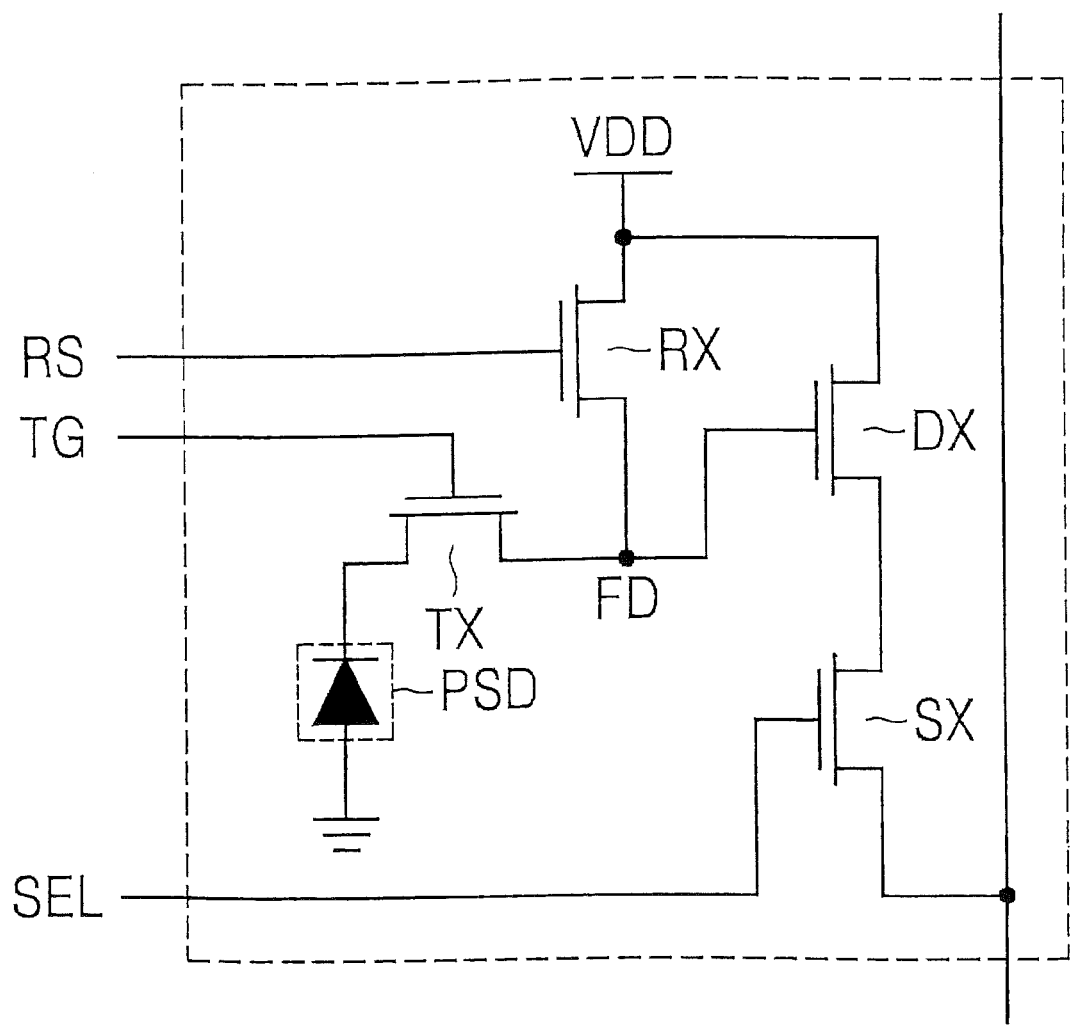
FIGS. 2A to 2D show circuit diagrams of the pixel illustrated in FIG. 1, according to example embodiments of the present invention.

As illustrated in FIG. 2A, a photo-electrical conversion element (or photosensitive element (PSD)) and four transistors RX, TX, DX and SX are embodied in an active region (e.g., region shown in dotted line). Referring to FIG. 2A, the PSD may generate photo-charges based on an incident light thereon.

The PSD is a photosensitive element and may be embodied as a photo diode, a photo transistor, a photo gate or a pinned photo diode (PPD). The reset transistor RX may reset a floating diffusion region (FD) in response to a reset signal RS output from a control circuit, e.g., the vertical decoder/row driver 25. The transmission transistor TX may transmit photo-charges generated by the PSD to the FD in response to a control signal TG output from the control circuit, e.g., the vertical decoder/row driver 25. The driver transistor DX performing a role of a source follower buffer amplifier may perform a buffering operation in response to photo-charges charged in the FD. The selection transistor SX may output a pixel signal output from the driver transistor DX to a column line in response to a control signal SEL output from the control circuit, e.g., the vertical decoder/row driver 25.

Figure 2B:
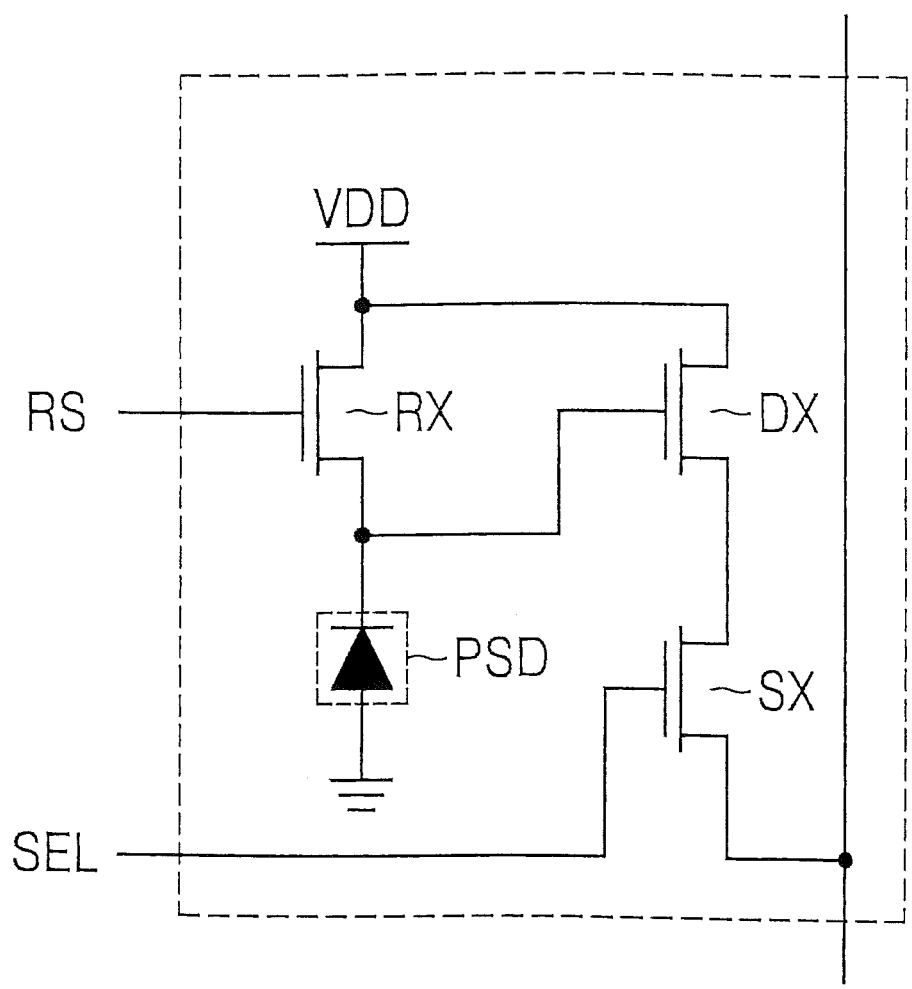
Figure 2C:
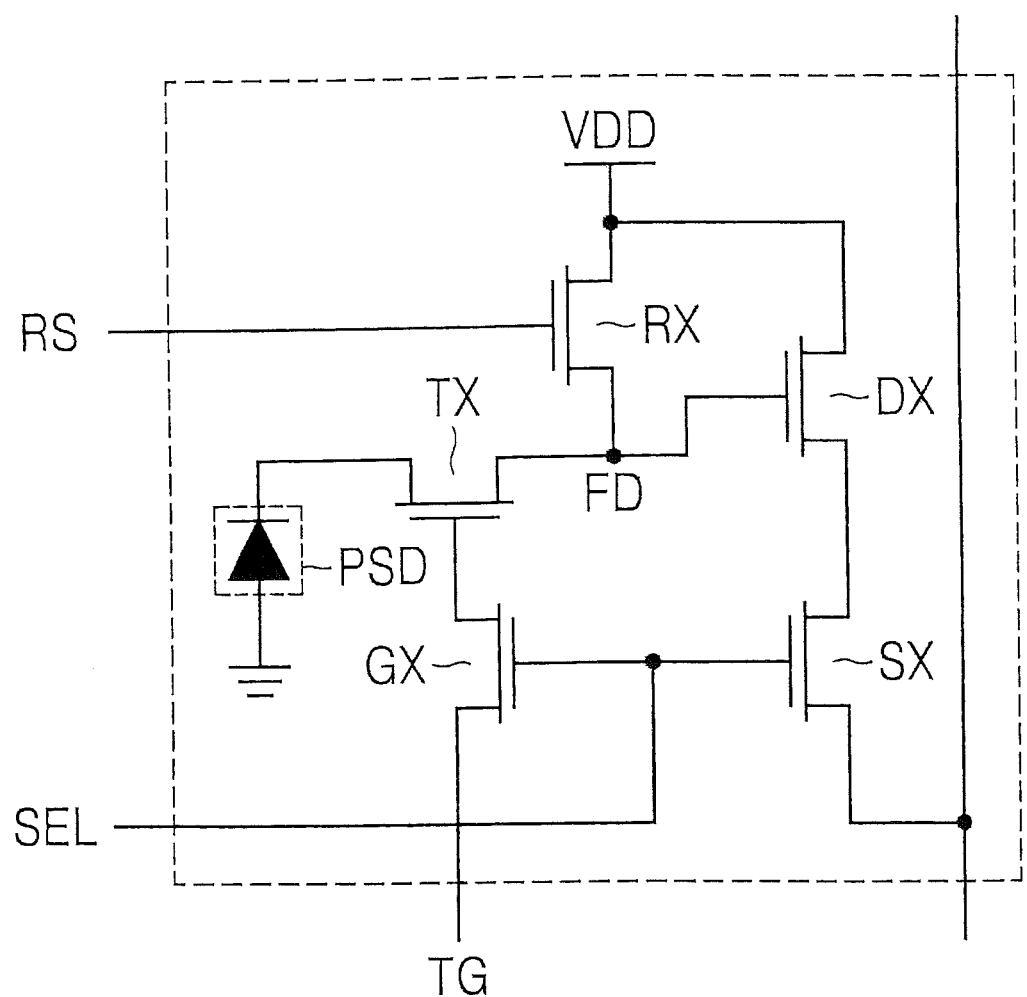
Figure 2D:
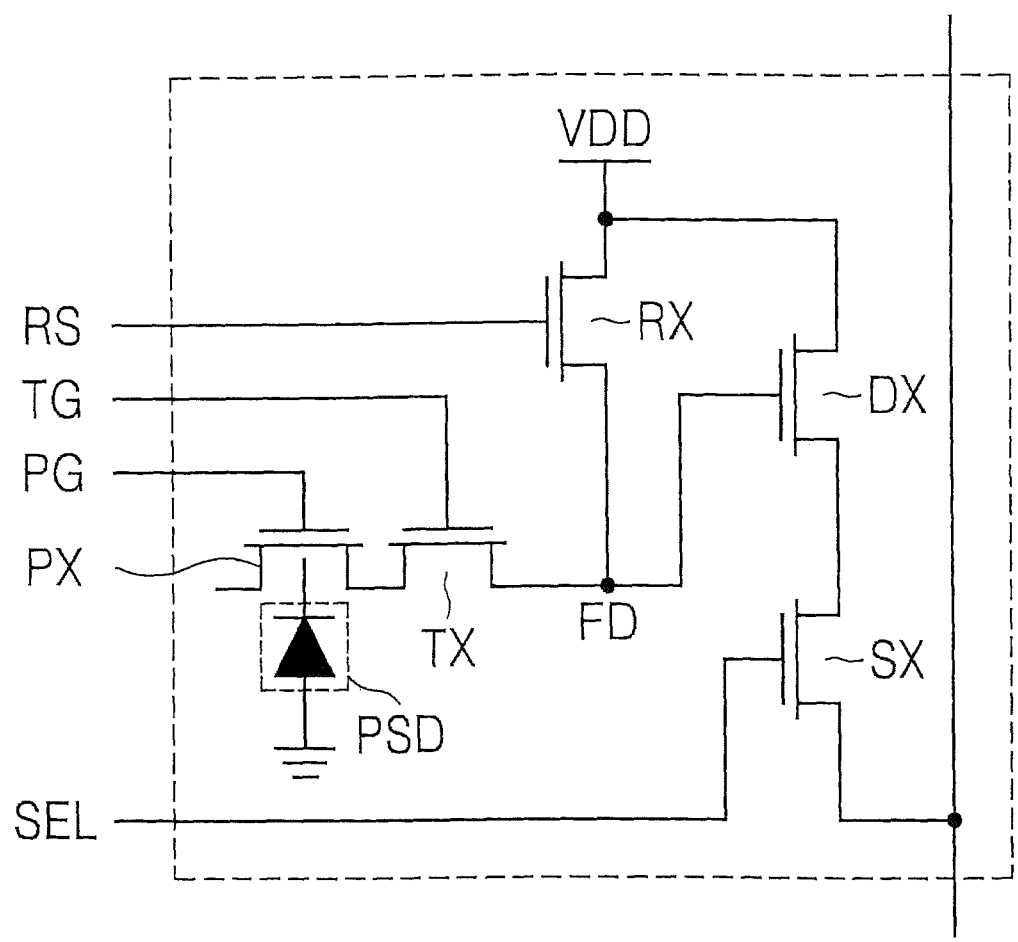

As the pixels 21 in FIGS. 2B through 2D are at least somewhat similar to the pixel 21 in FIG. 2A, an explanation of similar structures and/or operations thereof will be omitted for the sake of clarity.

As illustrated in FIG. 2B, a photoelectrical conversion element (PSD) and three transistors RX, DX and SX are embodied in an active region. Referring to FIGS. 2A and 2B, the transmission transistor TX is not embodied in an active region of FIG. 2B. Instead, the photocharge (or photocurrent)

accumulated by the photo-electrical conversion element (or photosensitive element (PSD)) is output directly to the floating diffusion node FD As illustrated in FIG. 2C, a photoelectrical conversion element (PSD) and five transistors RX, TX, DX, SX and GX are embodied in an active region. Referring to FIG. 2C, a control signal TG for controlling an operation of the transmission transistor TX is supplied to a gate of the transmission transistor TX through a transistor GX, which turns on/off in response to a control signal SEL.

As illustrated in FIG. 2D, a photoelectrical conversion element (PSD) and five transistors RX, TX, DX, SX and PX are embodied in an active region. A transistor PX operates in response to a control signal PG output from the vertical decoder/row driver 25 and forms an electrical path between the photo sensitive device PD and the transfer transistor TX.

Referring back to FIG. 1, the vertical decoder/row driver 25 may output a plurality of control signals for controlling a photoelectrical conversion operation of a plurality of pixels arranged in a row direction. The plurality of control signals may include the signals RS, TG, SEL and PG shown in FIGS. 2A to 2D.

An active road block 30 includes a plurality of active road circuits. Each of the plurality of active road circuits is connected to a corresponding one of the plurality of column lines 22-1 to 22-m of the pixel array 20. Each active road circuit includes a switch 31-1 to 31-m. Each active road circuit may further include a current source according to embodiments. Each switch 31-1, 31-2, ..., 31-m may supply a bias current to each column line 22-1 to 22-m. Accordingly, each column line 22-1 to 22-m may be enabled/disabled according to a switching operation of each switch 31-1, 31-2, ..., 31-m.

Here, that a column line is enabled infers a state in which a pixel connected to the column line may perform a processing for outputting a pixel signal and a pixel signal output from the pixel may be transmitted to the analog readout circuit 40. On the contrary, that a column line is disabled infers not only a state in which a pixel connected to the column line may not perform a processing for outputting a pixel signal but also infers a state in which any pixel signal is not output from the pixel.

Each switch 31-1, 31-2, ..., 31-m may be turned on/off by a corresponding transistor according to a level of each selection signal PS1, PS2, ..., PSm output to a corresponding gate thereof from each unit selection circuit 53-1, 53-2, ..., 53-m of the data output block 50. For example, when a switch 31-1 is turned on in response to a selection signal PS1 having a high level, an active road circuit including the switch 31-1 is enabled and a column line 22-1 connected to the active road circuit is enabled accordingly. Therefore, a pixel signal PX1 output from a pixel connected to the column line 22-1 may be transmitted to an analog readout circuit 40 through the column line 22-1. An operation of each unit selection circuit 53-1, 53-2, ..., 53-m will be explained in further detail with respect to FIG. 3.

The analog readout circuit 40 is a signal processing circuit, which may process each pixel signal PX1, PX2, ..., PXm output from each column line 22-1 to 22-m. However, the analog readout circuit 40 may generally only process pixel signals output from selected column lines during a preview operation.

According to example embodiments, the analog readout circuit 40 may include a plurality of correlated double sampling (CDS) circuits (not shown). Each of the plurality of CDS circuits may be connected to a corresponding one of a plurality of column lines 22-1 to 22-m, perform CDS on a pixel signal output from the corresponding column line and output a correlated double sampled pixel signal. According to another example embodiment, the analog readout circuit 40 may further include a plurality of analog to digital conversion circuits (not shown). The plurality of analog to digital conversion circuits may be connected to a corresponding one of the plurality of CDS circuits and convert a correlated double sampled pixel signal to a digital signal, respectively.

The data output block 50 may process and output each output signal D1, D2, ..., Dm output from the analog readout circuit 40 as an output signal DOUT. The data output block 50 may include a selection circuit and an output circuit.

The selection circuit includes the plurality of unit selection circuits 53-1, 53-2, ..., 53-m. Each of the plurality of unit selection circuits 53-1, 53-2, ..., 53-m may generate each selection signal PS1 to PSm for controlling an operation of each switch 31-1 to 31-m embodied in each active road circuit based on a corresponding one of column selection signals CSEL1, CSEL2, ..., CSELm output from the horizontal decoder 60.

The output circuit may include a plurality of unit output circuits. Each of the plurality of unit output circuits may include a buffer 51-1 to 51-m, a switch circuit 55-1 to 55-m and a switch control circuit 57-1 to 57-m. Each switch control circuit 57-1 to 57-m may turn on/off a corresponding switch circuit 55-1 to 55-m in response to a corresponding one the selection signals CSEL1, CSEL2, ..., CSELm output from the horizontal decoder 60. For example, each switch control circuit 57-1 to 57-m may be embodied as an inverter.

The horizontal decoder 60, which may also be called a column decoder, may decode column addresses HDA output from the timing controller 70 and output column selection signals CSEL1, CSEL2, ..., CSELm according to a decoding result.

The timing controller 70, in response to control signals, generates control signals, e.g., including row addresses VDA, for controlling an operation of the vertical decoder/row driver 25, at least one control signal for controlling an operation of the analog readout circuit 40, control signals for controlling an operation of the data output block 50 and control signals, e.g., including column addresses HDA, for controlling an operation of the horizontal decoder 60. The row addresses VDA may be called vertical decoder addresses and the column addresses HDA may be called horizontal decoder addresses.

Figure 3:
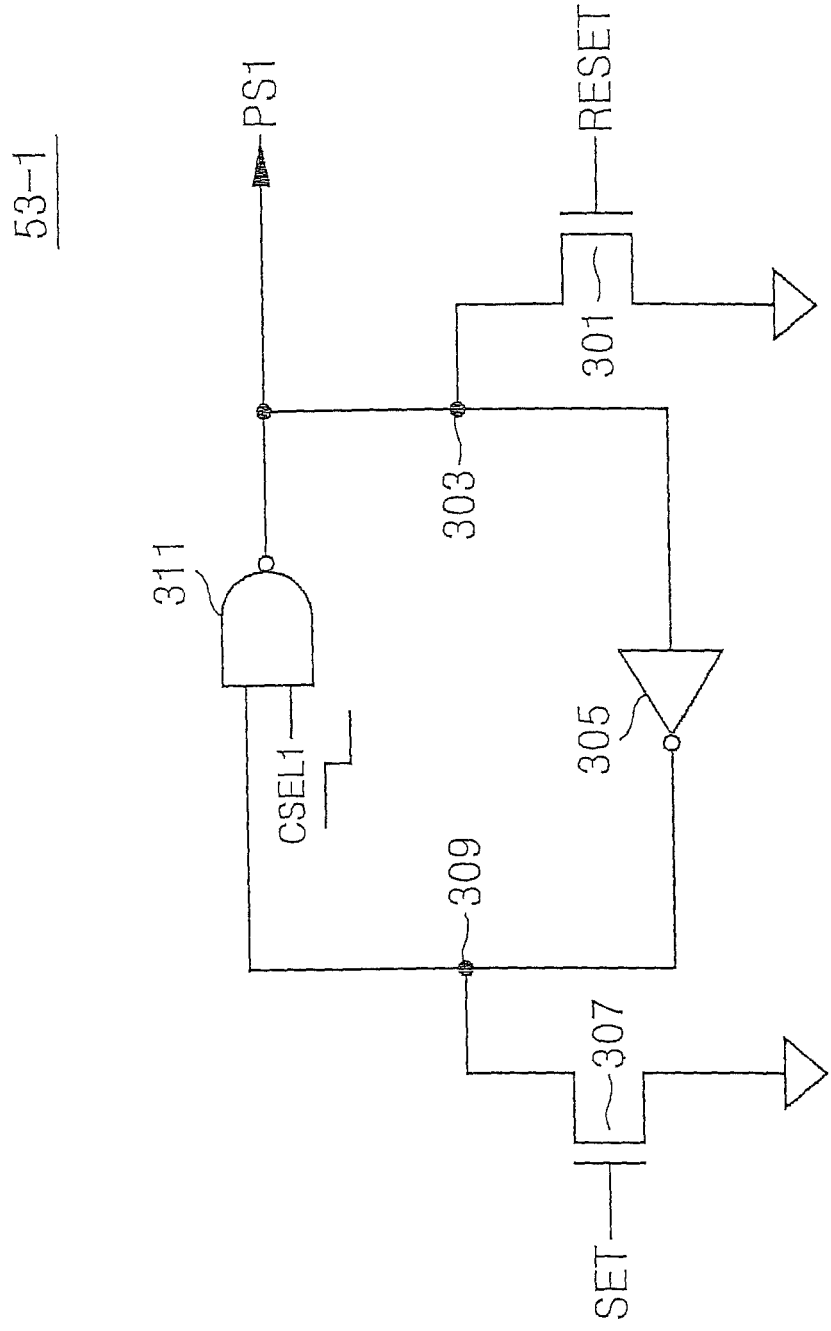
FIG. 3 shows a circuit diagram of a unit selection circuit illustrated in FIG. 1.
Figure 4:
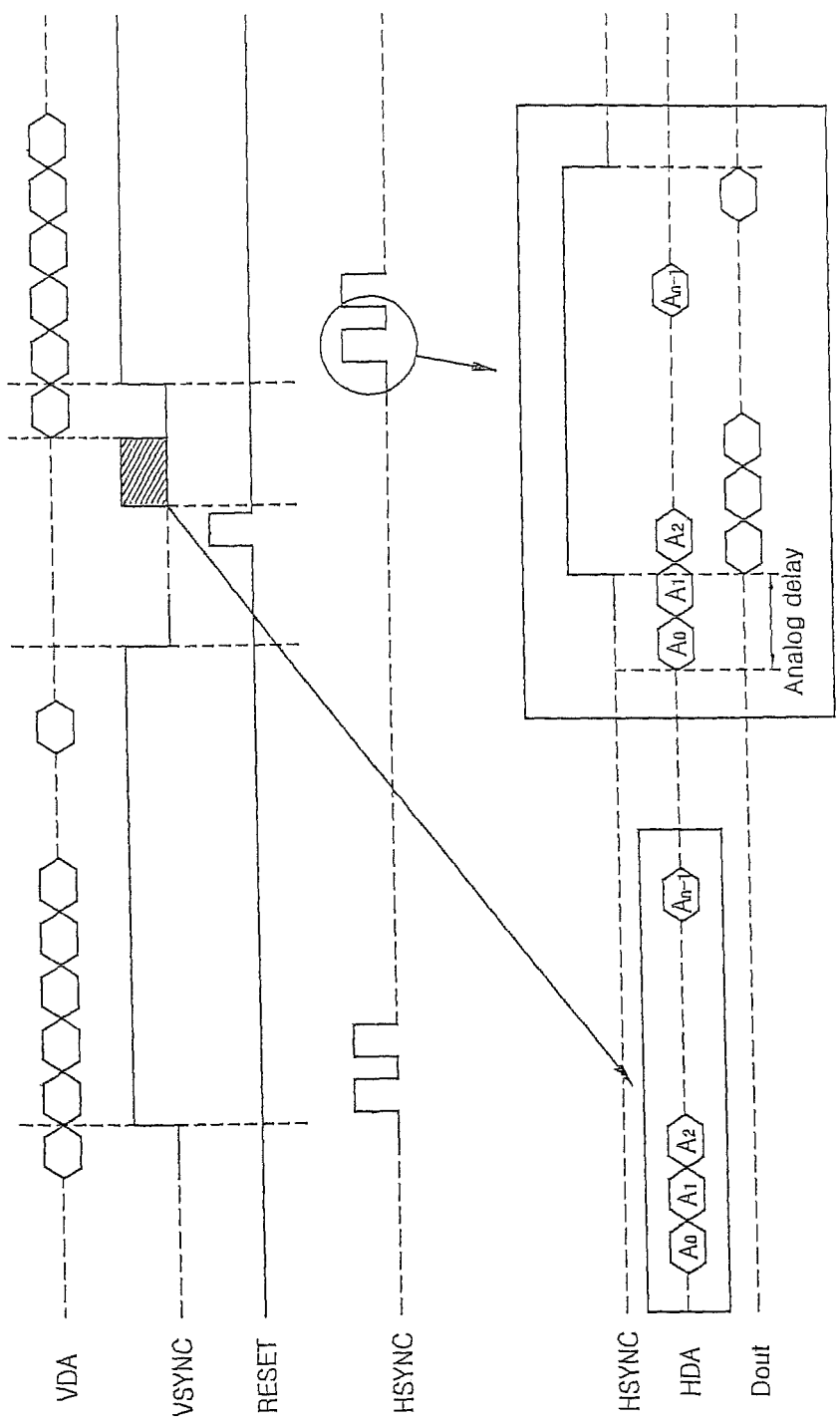
FIG. 4 is a timing diagram showing an operation of an image sensor illustrated in FIG. 1.

FIG. 3 shows a circuit diagram of a unit selection circuit illustrated in FIG. 1, and FIG. 4 is a timing diagram for explaining an operation of an image sensor illustrated in FIG. 1. Each of the plurality of unit selection circuits 53-1, 53-2, ..., 53-m are generally similar in structure. Accordingly, a structure and an operation of a unit selection circuit 53-1 is explained as follows with respect to FIG. 3.

The unit selection circuit 53-1 includes a first switch 301, an inverter 305, and a selection signal generator 311. For example, the selection signal generator 311 may be embodied as a NAND circuit.

The first switch 301 resets an output terminal of the selection signal generator 311 to initialization, e.g., a ground level, in response to a reset signal output from the timing controller 70. The first switch 301 may be embodied as an NMOS transistor connected between an output terminal 303 of the unit selection circuit 53-1 and a ground.

As illustrated in FIG. 4, a reset signal RESET may occur before first column addresses HDA are input. The first column addresses HDA include addresses $A_0, A_1, A_2, \ldots, A_{n-1}$ output from the timing controller 70 during a vertical blank interval, e.g., while a vertical synchronization signal (VSYNC) is a low level, where n is a natural number. The addresses $A_0, A_1, A_2, \ldots, A_{n-1}$ are addresses for selecting one or more column lines to read, e.g., one or more column lines to enable, among all the column lines 22-1 to 22-m embodied in the pixel array 20. For example, the addresses $A_0, A_1, A_2, \ldots, A_{n-1}$ may be addresses for selecting odd numbered column lines, even numbered column lines or column lines of a multiple of K among a plurality of column lines 22-1 to 22-m. Here, K is a natural number greater than 2.

An output terminal 303 of the unit selection circuit 53-1 is pulled-down by a reset signal and a voltage level of an output terminal 309 of an inverter 305 becomes a high level. Therefore, the selection signal generator 311 outputs a selection signal PS1 in response to a voltage level of the output terminal 309 of the inverter 305 and a voltage level of a column selection signal CSEL1.

For example, when a first column line 22-1 is not selected, e.g., when it is not necessary to read a pixel signal PX1 of the first column line 22-1, the horizontal decoder 60 outputs a first column selection signal CSEL1 having a high level in response to first addresses A0. The NAND circuit 311 of the unit selection circuit 53-1 outputs a first selection signal PS1 having a low level, so that a switch 31-1 of the active road circuit connected to the first column line 22-1 is turned off. Accordingly, any pixel signal PX1 does not occur from a pixel 21 connected to the first column line 22-1 and the analog readout circuit 30 connected to the first column line 22-1 may not read a pixel signal PX1 of the first column line 22-1.

However, when the first column line 22-1 is selected, e.g., when it is necessary to read a pixel signal PX1 of the first column line 22-1, the horizontal decoder 60 outputs a first column selection signal CSEL1 transiting from a high level to a low level in response to the first addresses A0. Subsequently, the NAND circuit 311 of the unit selection circuit 53-1 outputs a first selection signal PS1 having a high level, so that a switch 31-1 of the active road circuit connected to the first column line 22-1 is turned on. Accordingly, the first column line 22-1 is enabled by the active road circuit, and when a pixel signal PX1 is transmitted to the first column line 22-1 from a pixel 21 connected to the first column line 22-1, the analog readout circuit 30 may read a pixel signal PX1 of the first column line 22-1.

The unit selection circuit 53-1 may further include a second switch 307 switched in response to a set signal SET. The second switch 307 may be embodied as an NMOS transistor connected between an output terminal 309 of the inverter 305 and a ground. When the set signal SET having a high level is input to the second switch 307, the NAND circuit 311 of the unit selection circuit 53-1 outputs a first selection signal PS1 having a high level regardless of a level of the first column selection signal CSEL1.

However, when the set signal having a low level is input to the second switch 307, the NAND circuit 311 of the unit selection circuit 53-1 may output a first selection signal PS1 having a low level or a high level according to a level of the first column selection signal CSEL1. Each operation of other unit selection circuits 53-2 to 53-m is similar to an operation of the unit selection circuit 53-1, so a detailed explanation of an each operation of the other unit selection circuits 53-2 to 53-m is omitted.

Each of a plurality of unit selection circuits 53-1, 53-2, ..., 53-m may store one-bit information indicating selection/non-selection for every column line 22-1 to 22-m embodied in the pixel array 20. Accordingly, each of the plurality of unit selection circuits 53-1, 53-2, ..., 53-m may perform a function of a memory device, which may store one-bit information.

After one ore more column lines to read are selected among all column lines 22-1 to 22-m embodied in the pixel array 20 by first column addresses generated in a vertical blank interval, row addresses VDA are input to the vertical decoder/row driver 25 by the timing controller 70. The vertical blank interval, which may also be called a vertical interval, indicates time difference between a last line of a (current) frame and a start line of a next frame.

The timing controller 70 outputs second column addresses similar to first column addresses to the horizontal decoder 60 during an active interval, e.g., while the vertical synchronization signal (VSYNC) is high level. Subsequently, the horizontal decoder 60 decodes the second column addresses and generates a plurality of column selection signals CSEL1, CSEL2, ..., CSELm.

The data output block 50 processes, e.g., buffering or analog-to-digital conversion, signals output from the analog readout circuit 40 in response to the plurality of column selection signals CSEL1, CSEL2, ..., CSELm and output processed signals.

While FIGS. 1 and 3 illustrate each column selection signal CSEL1 to CSELm being low active, example embodiments are not limited thereto.

As described above, the image sensor 10 of the present invention selects one or more column lines to read among all column lines 22-1 to 22-m, which are embodied in the pixel array 20, in advance by using first column addresses (or pre-column addresses) during a vertical blank interval of a preview operation and processes only pixel signals output from one or more previously selected column lines by using second column addresses (or main column addresses) similar to or the same as the first column addresses during an active interval of the preview operation.

Accordingly, because the image sensor 10 of the present invention processes only pixel signals output from some of the column lines among all the column lines 22-1 to 22-m embodied in the pixel array 20 during a preview operation, and because pixels connected to the remaining column lines, which are not necessary to read, do not generate any pixel signal, unnecessary power consumption may be reduced in the image sensor 10.

Figure 5:
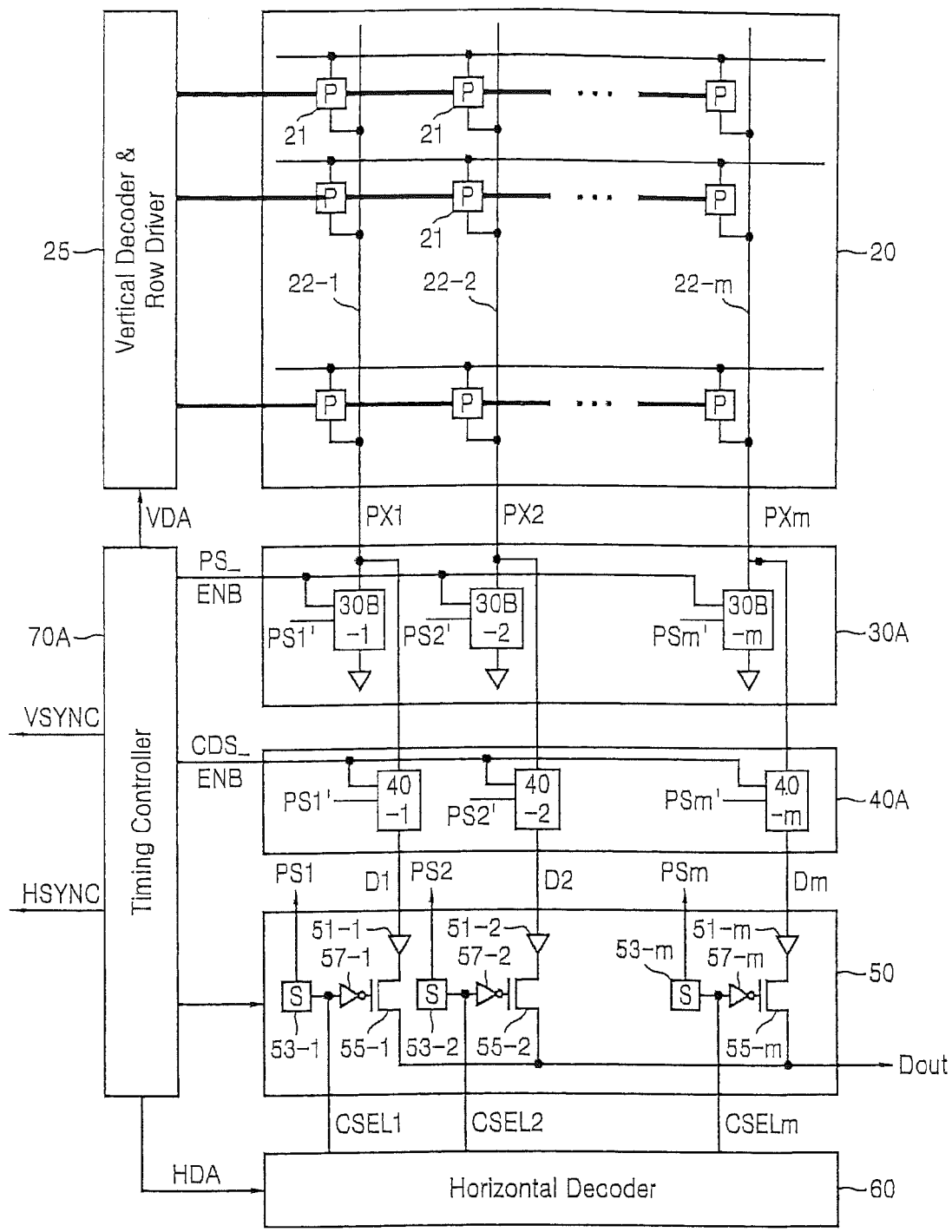
FIG. 5 shows a block diagram of an image sensor according to another example embodiment of the present invention.

FIG. 5 shows a block diagram of an image sensor according to another example embodiment of the present invention. A structure and an operation of an image sensor 10A of FIG. 5 are the same as a structure and an operation of the image sensor 10 illustrated in FIG. 1 except for an active road block 30A, an analog readout circuit 30A and a timing controller 70A. Therefore, only a structure and an operation of the active road block 30A, the analog readout circuit 30A and the timing controller 70A will be discussed below.

The active road block 30A includes a plurality of active road circuits 30B-1, 30B-2, ..., 30B-m. Each of the plurality of active road circuits 30B-1, 30B-2, ..., 30B-m is connected to each of a plurality of column lines 22-1 to 22-m embodied in the pixel array 20 and controls enable/disable of each of the plurality of column lines 22-1 to 22-m.

The analog readout circuit 40A includes a plurality of CDS circuits 40-1, 40-2, ..., 40-m. Each CDS circuit 40-1, 40-2, ..., 40-m is an example of a circuit for processing a pixel signal output from a corresponding one of the column lines 22-1 to 22-m.

The timing controller 70A may output an active road control signal PS_ENB for controlling an operation of the plurality of active road circuits 30B-1, 30B-2, ..., 30B-m and output a CDS control signal CDS_ENB for controlling an operation of a plurality of CDS circuits 40-1, 40-2, ..., 40-m.

The active road control signal PS-ENB and the CDS control signal CDS_ENB are low active.

Figure 6:
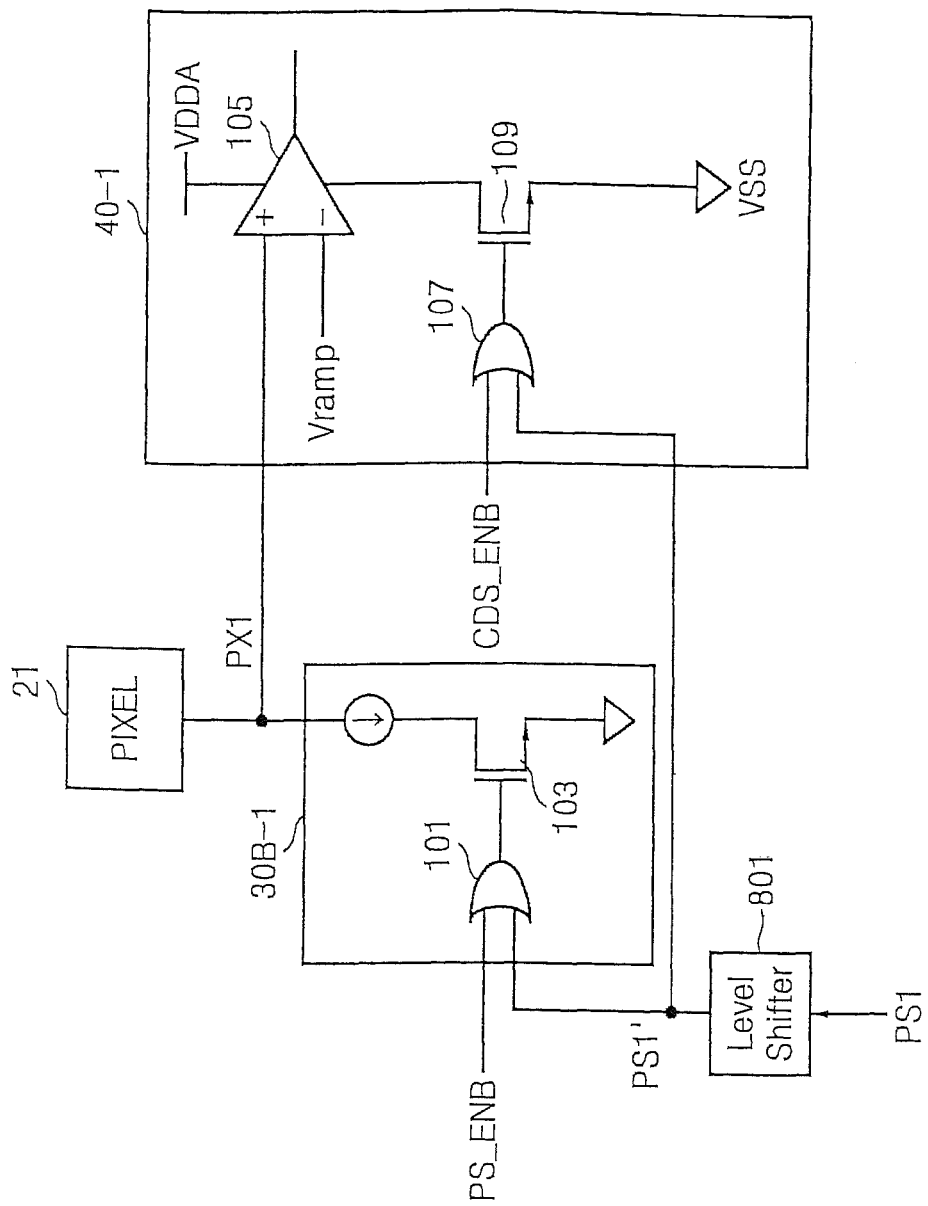
FIG. 6 shows part of an image sensor illustrated in FIG. 5.

FIG. 6 shows part of the image sensor illustrated in FIG. 5. Referring to FIGS. 5 and 6, the active road circuit 30B-1 includes a switch control circuit 101 and a switch 103. According to embodiments, the active road circuit 30B-1 may further include a current source. The active road circuit 30B-1 may also include a level shifter 801. According to embodiments, the level shifter 801 may be embodied in each of the plurality of unit selection circuits 53-1, 53-2, ..., 53-m. The level shifter 801 shifts a level of a selection signal PS1 and outputs a level-shifted selection signal PS1'.

The switch control circuit 101 may control on/off of a switch 103 in response to the active road control signal PS_ENB and the level-shifted selection signal PS1'. When the switch 103 is turned on in response to an output signal of a switch control circuit 101, an active road circuit 30B-1 and a first column line 22-1 are enabled. For example, a switch control circuit 101 may be embodied as an OR circuit. When the active road control signal PS_ENB is high level, the switch control circuit 101 may output a control signal having a high level to the switch 103 regardless of a level of an output signal PS1' of the level shifter 801. For example, the active road control signal PS_ENB may control a preview operation according to embodiments of the present invention.

A first CDS circuit 40-1 includes a comparator 105 for comparing a pixel signal PX1 with a ramp signal Vramp, a switch control circuit 107 and a switch 109.

The switch control circuit 107 outputs a control signal for turning on/off the switch 109 in response to a CDS control signal CDS_ENB and a level-shifted selection signal PS1'. Accordingly, the first CDS circuit 40-1 is turned on/off according to on/off of the switch 109. For example, the switch control circuit 107 may be embodied as an OR circuit. For example, when the CDS control signal CDS_ENB is low level, the comparator 105 may be on/off in response to the level-shifted selection signal PS1'.

Since each CDS circuit 40-1, 40-2, ..., 40-m may be enabled/disabled in response to a corresponding one of the level-shifted selection signal PS1', ..., PSm' corresponding to one of the selection signals PS1, ..., PSm, the image sensor 10A of the present invention may reduce unnecessary power consumption by processing pixel signals output from only some of the column lines, so that not all column lines 22-1 to 22-m embodied in the pixel array 20 are selected.

Figure 7:
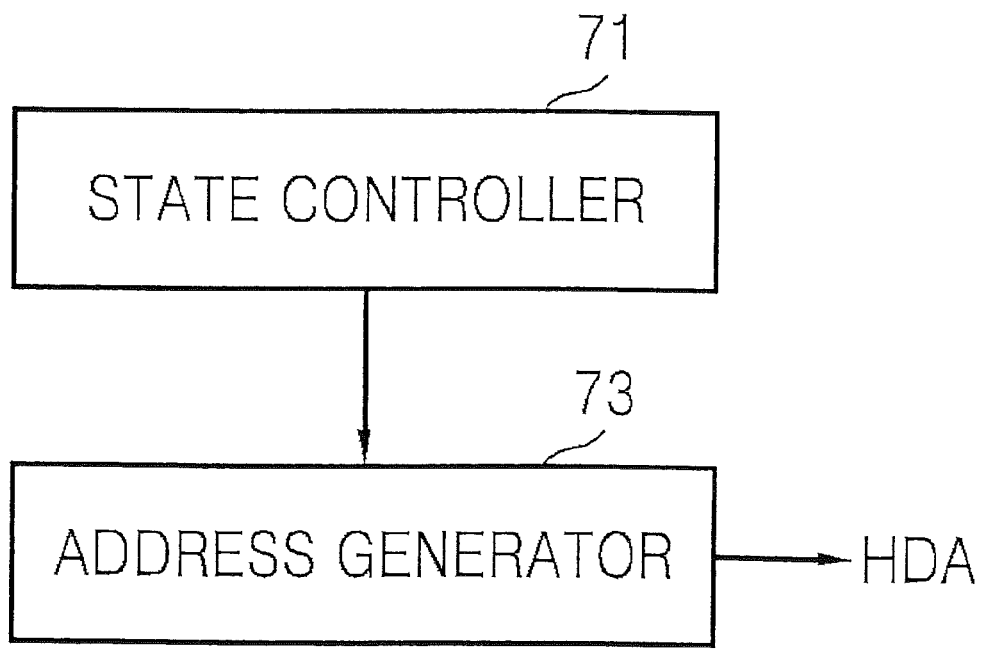
FIG. 7 shows a schematic block diagram of a timing controller illustrated in FIGS. 1 and 5.
Figure 8:
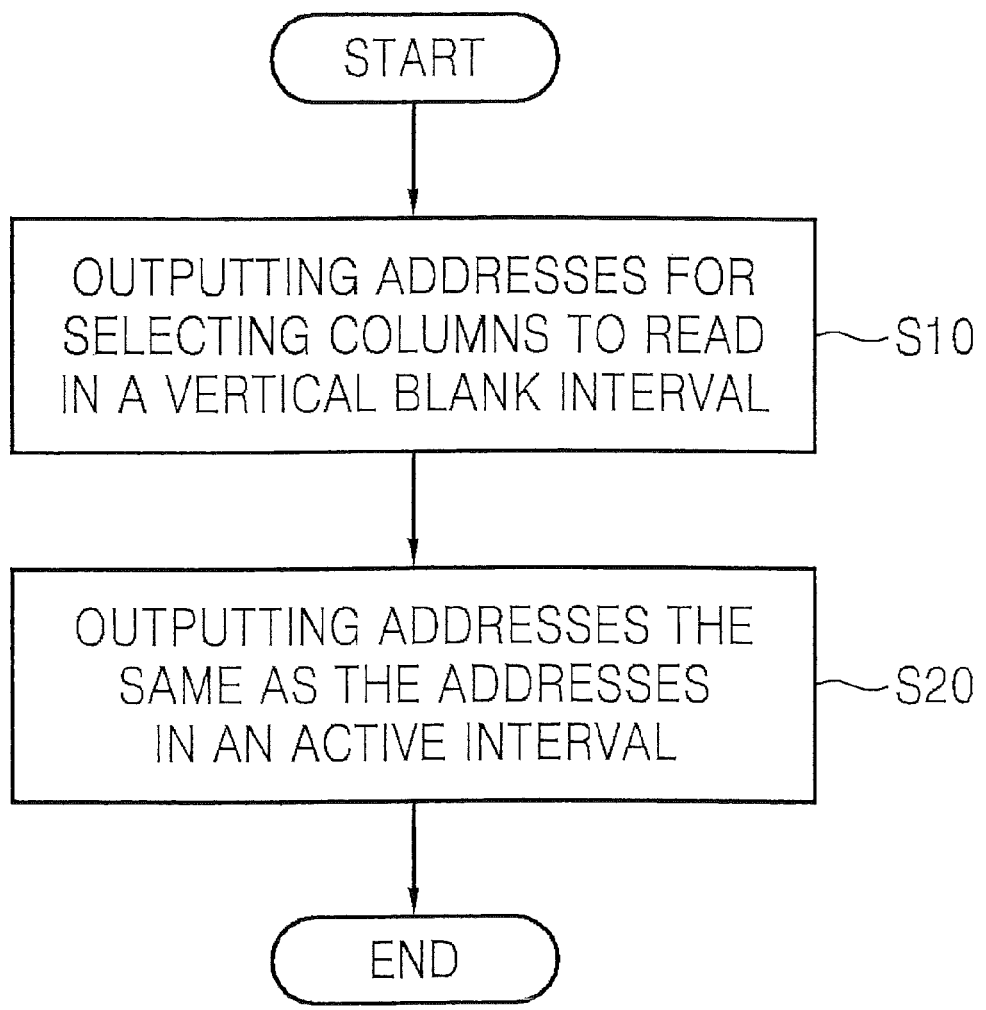
FIG. 8 shows a flowchart explaining an operation of the timing controller illustrated in FIG. 7.

FIG. 7 shows a schematic block diagram of a timing controller illustrated in FIGS. 1 and 5, and FIG. 8 shows a flowchart explaining an operation of the timing controller illustrated in FIG. 7. Each timing controller 70 or 70A (collectively, 70), which may be used in each image sensor 10 or 10A (collectively, 10), includes a state controller 71 for controlling an operation of the timing controller 70.

The state controller 71 may control an operation of a column address generator 73 in response to control signals input externally, as an example of a state machine.

Referring to FIGS. 4 and 8, the column address generator 73 during a preview operation outputs first column addresses for selecting some of the column lines, e.g., column lines to read, from among all of the column lines 22-1 to 22-m embodied in the pixel array 20 during a vertical blank interval (S10).

The column address generator 73 outputs second column addresses that are similar to or the same as the first column addresses during an active interval (S20). Since the active road block 30 or 30A enables only those column lines selected from among all the column lines 22-1 to 22-m embodied in the pixel array 20, the analog readout circuit 40 or 40A may process pixel signals output from the selected column lines only.

Figure 9:
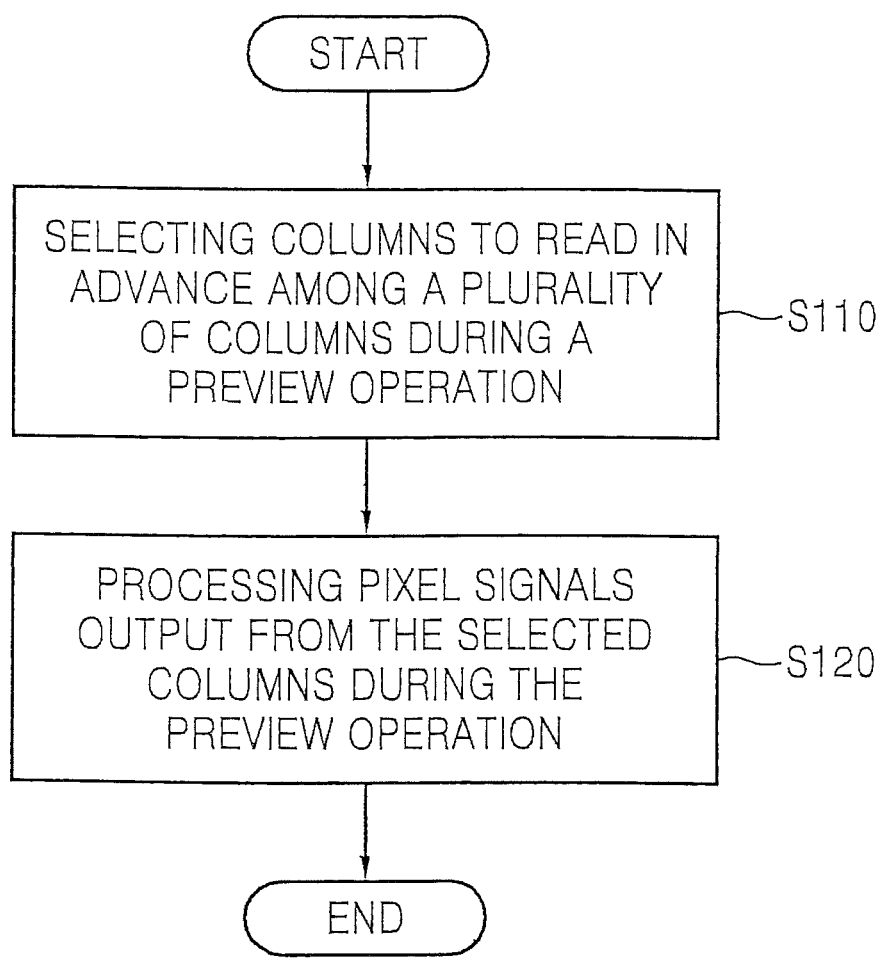
FIG. 9 is a flowchart showing an operation of the image sensor illustrated in FIGS. 1 and 5.

FIG. 9 is a flowchart showing an operation of the image sensor illustrated in FIGS. 1 and 5. The image sensor 10 of the present invention selects one or more column lines to read in advance from among all the column lines 22-1 to 22-m embodied in the pixel array 20 by using first column addresses during a vertical blank interval of a preview operation (S110), and processes only pixel signals output from one or more previously selected column lines by using second column addresses that are similar to or the same as the first column addresses during an active interval of the preview operation (S120).

Figure 10:
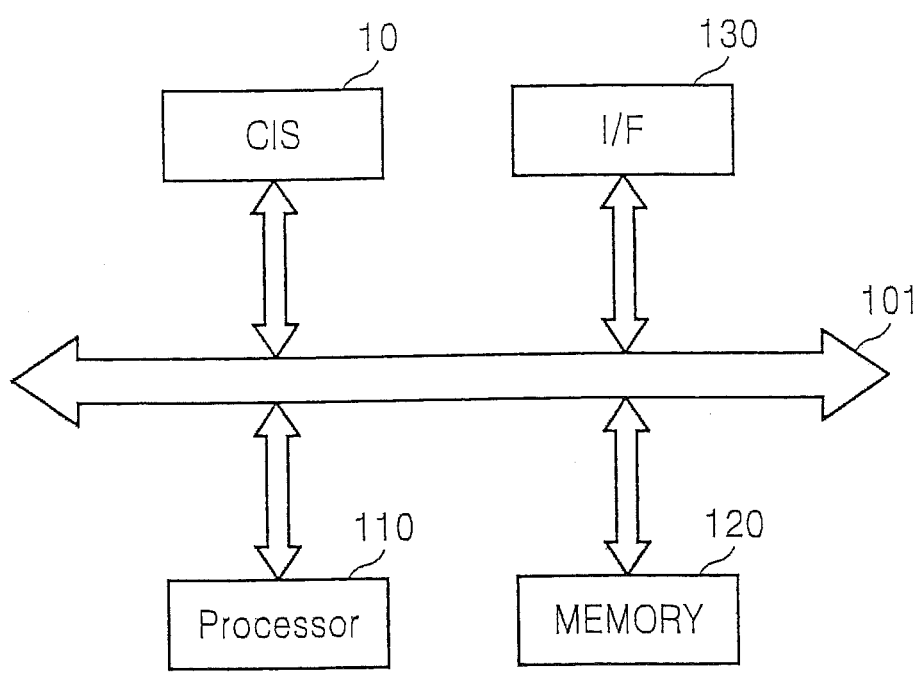
FIG. 10 shows a block diagram of an image pick-up device including the image sensor illustrated in FIGS. 1 and 5.

FIG. 10 shows a block diagram of an image pick-up device including the image sensor illustrated in FIGS. 1 and 5. The image pick-up (or capture) device 100 may include a digital camera, a mobile phone, a smart phone having the digital camera and/or any electronic devices including the digital camera. The image pick-up device 100 may process two-dimensional image information or three-dimensional image information. The digital camera may include the image sensor 10 according to an example embodiment of the present invention.

The image pick-up (or capture) device 100 may include an image sensor 10 according to an example embodiment of the present invention and a processor 110 for controlling an operation of the image sensor 10. The image pick-up device 100 may further include an interface 130. The interface 130 may be an image display device. Therefore, the image display device may display a preview image captured by the image sensor 10 under a control of the processor 110.

The image pick-up device 100 may include a memory device 120 storing a still image or a video, which are captured by the image sensor 10. The memory device 120 may be embodied as a non-volatile memory device. The non-volatile memory device may include a plurality of non-volatile memory cells.

The non-volatile memory cells may be embodied as an Electrically Erasable Programmable Read-Only Memory (EEPROM), a flash memory, a Magnetic RAM (MRAM), a Spin-Transfer Torque MRAM, a Conductive bridging RAM (CBRAM), a Ferroelectric RAM (FeRAM), a Phase change RAM (PRAM), a Resistive RAM (RRAM or ReRAM), a Nanotube RRAM, a Polymer RAM (PoRAM), a Nano Floating Gate Memory (NFGM), a holographic memory, a Molecular Electronics Memory Device or an Insulator Resistance Change Memory, respectively.

The image sensor according to embodiments of the present invention selects some column lines to enable in advance among all the column lines embodied in the pixel array during a preview operation and processes only pixel signals output from the selected column lines, so that power consumed by the image sensor may be reduced.

Although example embodiments of the present general invention have been shown and described, it will be appreciated by those skilled in the art that changes may be made in these embodiments without departing from the principles and spirit of the present general invention, the scope of which is defined in the appended claims and their equivalents.

What is claimed is:
1. An image sensor, comprising:
a pixel array including a plurality of pixels connected to column lines;
a plurality of signal processing circuits each connected to one of the column lines; and a plurality of selection circuits each connected to one of the signal processing circuits, wherein the selection circuits are configured to enable a first group of the signal processing circuits in response to first column select signals, wherein the first group of the signal processing circuits does not include all of the signal processing circuits, wherein the selection circuits include at least one latch circuit.

2. The image sensor of claim 1, wherein the first column select signals are provided from a column decoder.

3. The image sensor of claim 1, wherein the selection circuits are configured to generate enable signals for enabling the first group of the signal processing circuits based on the first column select signals.

4. The image sensor of claim 3, wherein the first group of the signal processing circuits are enabled based on a control enable signal provided via a control signal line.

5. The image sensor of claim 1, wherein only pixel signals output from column lines connected to the first group of the signal processing circuits are processed when the first group of the signal processing circuits is enabled.

6. The image sensor of claim 1, wherein the signal processing circuits include at least one analog-to-digital converter.

7. The image sensor of claim 1, wherein the signal processing circuits include at least one amplifier.

8. The image sensor of claim 1, wherein the first group of the signal processing circuits is enabled in a sub-sampling mode of the image sensor.

9. The image sensor of claim 1, wherein the selection circuits are configured to disable a second group of the signal processing circuits in response to second column select signals to reduce power while the first group of the signal processing circuits are enabled.

10. The image sensor of claim 1, wherein the at least one latch circuit is responsive to a set signal and a reset signal.

11. The image sensor of claim 10, wherein the set and reset signals are provided via a set signal line and a reset signal line, respectively.

* * * * *